US009623893B2

(12) United States Patent
Braidman

(10) Patent No.: US 9,623,893 B2
(45) Date of Patent: Apr. 18, 2017

(54) STROLLER ROLLER

(71) Applicant: Craig Morris Braidman, Alamo, CA (US)

(72) Inventor: Craig Morris Braidman, Alamo, CA (US)

(*) Notice: Subject to any disclaimer, the term of this patent is extended or adjusted under 35 U.S.C. 154(b) by 0 days.

(21) Appl. No.: 14/517,099

(22) Filed: Oct. 17, 2014

(65) Prior Publication Data
US 2016/0107670 A1    Apr. 21, 2016

(51) Int. Cl.
*B62B 9/22* (2006.01)
*B62B 5/00* (2006.01)
*B62B 7/04* (2006.01)
*B62B 9/12* (2006.01)

(52) U.S. Cl.
CPC ............ *B62B 5/0026* (2013.01); *B62B 7/044* (2013.01); *B62B 9/12* (2013.01); *B62B 9/22* (2013.01)

(58) Field of Classification Search
CPC ....................................... B62B 9/22
USPC ............................ 280/47.38, 47.41; 180/166
See application file for complete search history.

(56) References Cited

U.S. PATENT DOCUMENTS

| | | | | |
|---|---|---|---|---|
| 1,553,889 A | * | 9/1925 | Boettcher ................. | B62B 9/22 180/166 |
| 2,644,958 A | * | 7/1953 | Davis ...................... | A47D 9/02 5/109 |
| 3,319,271 A | * | 5/1967 | Anderson ................. | B62B 9/22 5/108 |
| 3,802,003 A | * | 4/1974 | Laureti .................... | A47D 9/02 5/108 |
| 3,820,614 A | * | 6/1974 | Askinazy ................. | B62B 9/22 180/166 |
| 3,921,948 A | * | 11/1975 | Long ...................... | A47F 5/0823 211/75 |
| 4,629,950 A | * | 12/1986 | Ching ..................... | H02P 7/05 180/166 |
| 5,572,903 A | * | 11/1996 | Lee ........................ | A47D 9/04 180/166 |
| 6,588,527 B2 | * | 7/2003 | Lerner .................... | B62B 9/22 180/166 |
| 7,971,885 B2 | * | 7/2011 | Sanders ................... | B62B 9/22 180/166 |
| 9,027,689 B1 | * | 5/2015 | Brien ...................... | B62B 9/22 180/166 |
| 2003/0098562 A1 | * | 5/2003 | Lerner .................... | B62B 9/185 280/47.41 |
| 2006/0040813 A1 | * | 2/2006 | Murphy, Jr. ............ | A63B 21/0552 482/148 |
| 2008/0088108 A1 | * | 4/2008 | Yoshida .................. | B60R 16/04 280/200 |
| 2008/0314665 A1 | * | 12/2008 | Sanders ................... | B62B 9/22 180/166 |

(Continued)

*Primary Examiner* — J. Allen Shriver, II
*Assistant Examiner* — Travis Coolman
(74) *Attorney, Agent, or Firm* — Plager Schack LLP

(57) ABSTRACT

A stroller roller, configured to be attached to a stroller having a frame attached to a wheel. The stroller roller includes a wheel clamp assembly configured to grasp the wheel. An extendable arm assembly is attached to the wheel clamp assembly. A frame clamp assembly is attached to the extendable arm assembly and configured to grasp the frame. The frame clamp assembly pushes the extendable arm assembly causing the wheel clamp assembly to rotate the wheel both clockwise and counterclockwise.

10 Claims, 4 Drawing Sheets

(56) References Cited

U.S. PATENT DOCUMENTS

| | | | |
|---|---|---|---|
| 2009/0064410 A1* | 3/2009 | Cohen | A47D 9/02 5/109 |
| 2011/0232985 A1* | 9/2011 | Lee | B62M 6/45 180/297 |
| 2014/0284443 A1* | 9/2014 | Forbes | G09F 21/04 248/313 |
| 2015/0197271 A1* | 7/2015 | Vashdi | B62B 9/22 180/166 |

* cited by examiner

STROLLER ROLLER

BACKGROUND

The embodiments herein relate generally to stroller accessories.

Prior to embodiments of the disclosed invention, there was no battery operated device configured to rock a stroller back and forth. Embodiments of the disclosed invention solve this problem.

SUMMARY

A stroller roller, can be configured to be attached to a stroller having a frame attached to a wheel. The stroller roller can include a wheel clamp assembly configured to grasp the wheel. An extendable arm assembly can be attached to the wheel clamp assembly. A frame clamp assembly can be attached to the extendable arm assembly and configured to grasp the frame. The frame clamp assembly can push the extendable arm assembly causing the wheel clamp assembly to rotate the wheel both clockwise and counterclockwise.

In some embodiments, the wheel clamp assembly can further include a first arm and a second arm rotationally connected to one another by a spring. An attachment protrusion can be mechanically coupled to the first arm. The first arm can further comprise a first arm upper portion and a first arm concave lower portion. The second arm can further comprise a second arm upper portion and a second arm concave lower portion. The spring can further bias the first arm upper portion away from the second arm upper portion while the first arm concave lower portion can be biased toward the second arm concave lower portion.

In some embodiments, the extendable arm assembly further comprises an inner shaft pivot attachment end mechanically coupled to an inner shaft. An outer shaft can cover at least some of the inner shaft. A locking knob can be mechanically coupled to the outer shaft. The locking knob is configured to stop movement of the inner shaft in and out of the outer shaft. An outer shaft pivot attachment end can be mechanically coupled to the outer shaft.

In some embodiments, the frame clamp assembly can further include a grip bracket that can be formed to have a grip bracket rail and a lock knob receiver. The lock knob receiver can be detachably coupled to an inner grip bar with a plurality of nuts and a lock knob. A motor rear housing can further comprise a motor rear housing bracket U-Channel and a motor rear housing motor cavity. The motor rear housing bracket U-Channel can be detachably coupled to the grip bracket. The motor can have a motor shaft and be configured within the motor rear housing motor cavity. The motor is configured to receive electrical power and use the electrical power to turn the motor shaft.

In some embodiments, a motor front housing mechanically coupled to the motor rear housing. The motor front housing can further comprise a battery compartment that can be configured to hold at least one battery. A battery cover can be detachably coupled to the battery compartment and a motor front housing motor cavity that can be configured to contain a portion of the motor.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
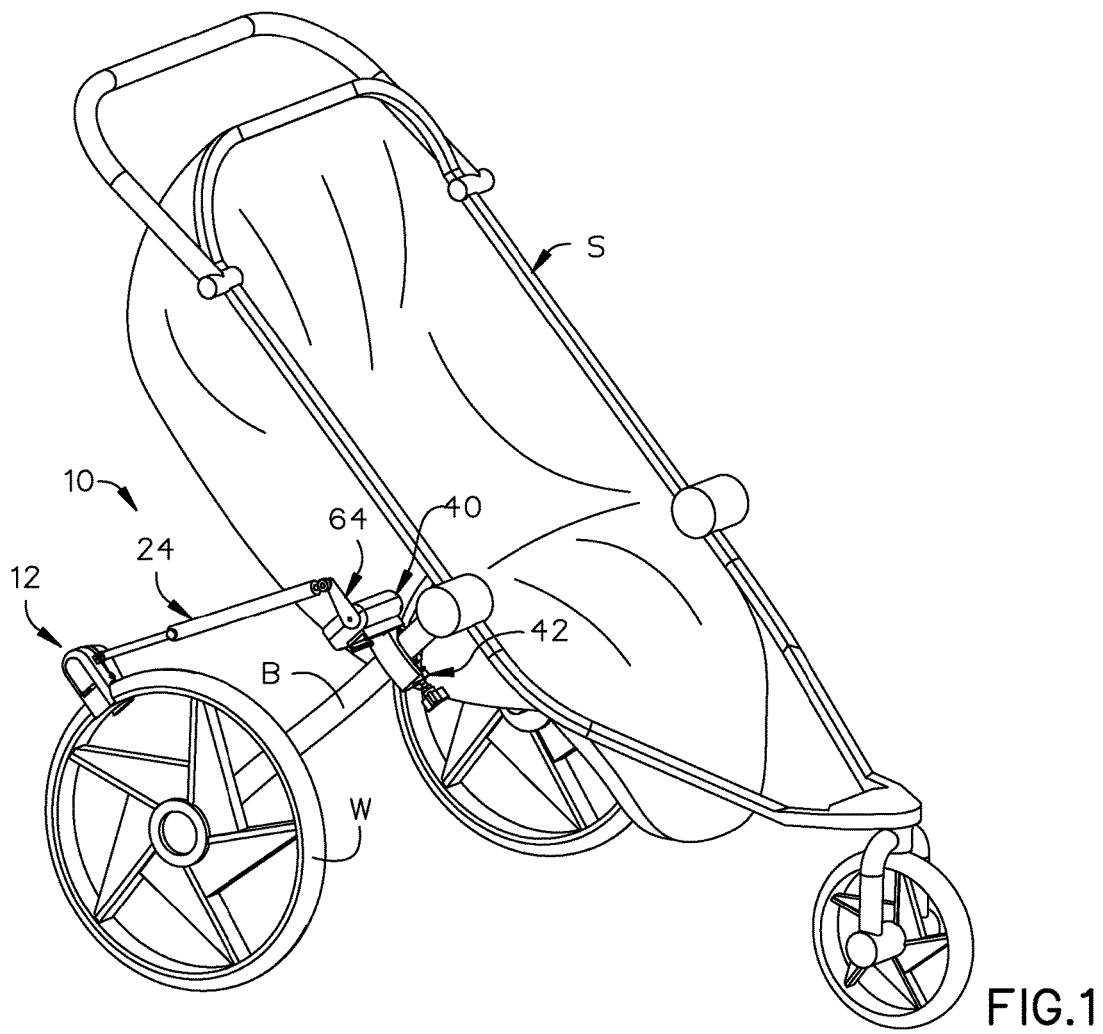
FIG. 1 is a perspective view of an embodiment of the invention shown in use.

By way of example, and referring to FIG. 1, stroller S comprises frame B that is attached to wheel W. A user desires to rock stroller S back and forth and stroller roller 10 accomplishes this.

Figure 3:
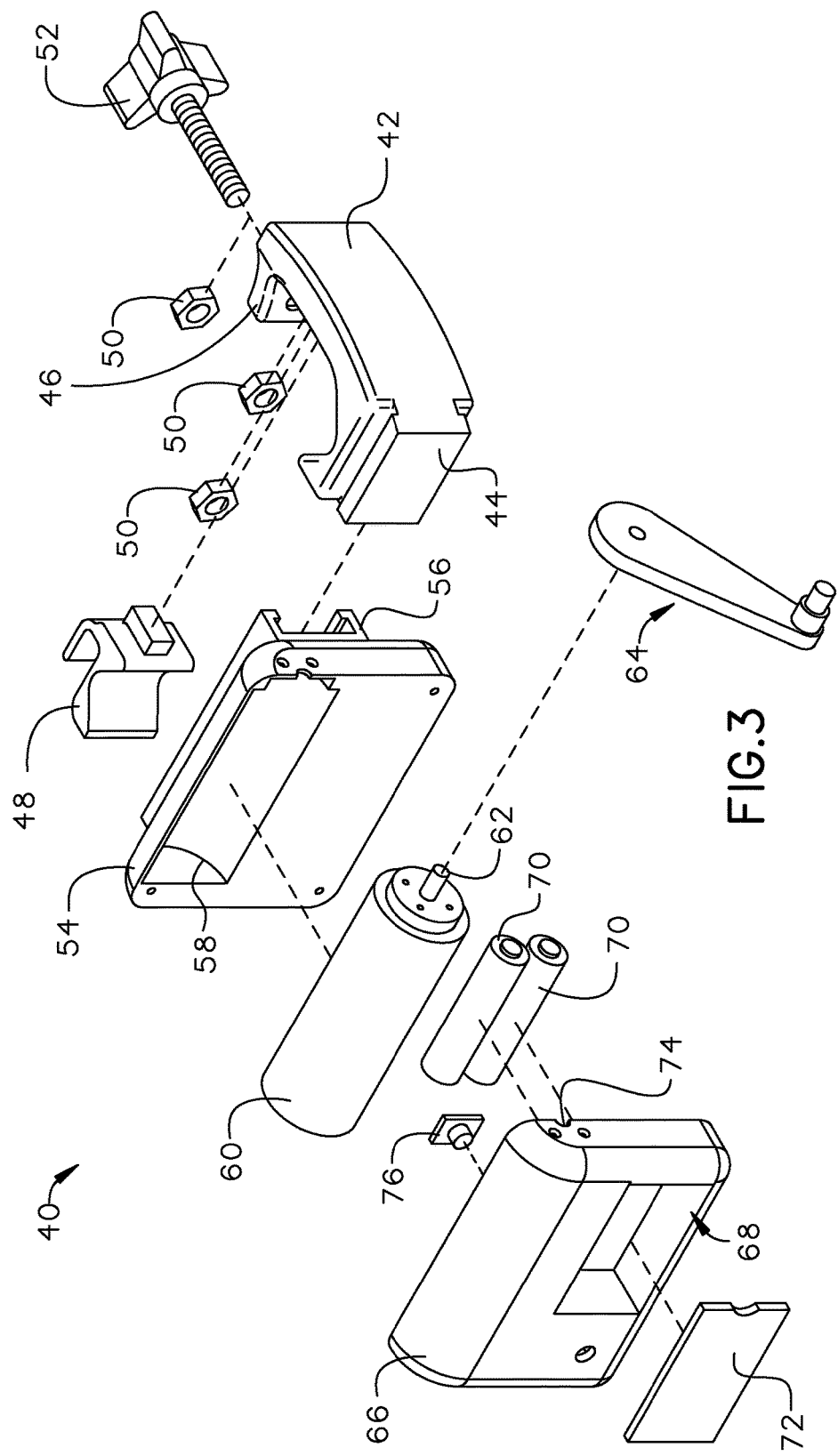
FIG. 3 is an exploded view of an embodiment of the invention.
Figure 4:
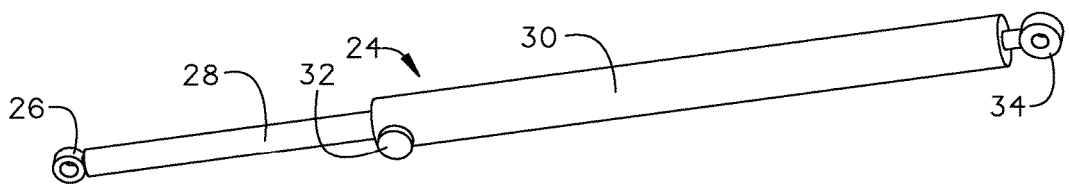
FIG. 4 is a perspective view of an embodiment of the extendable arm assembly shown in extended configuration.
Figure 5:
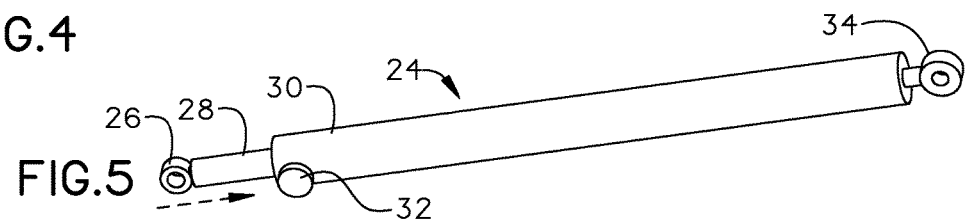
FIG. 5 is a perspective view of an embodiment of the extendable arm assembly shown in contracted configuration.
Figure 6:
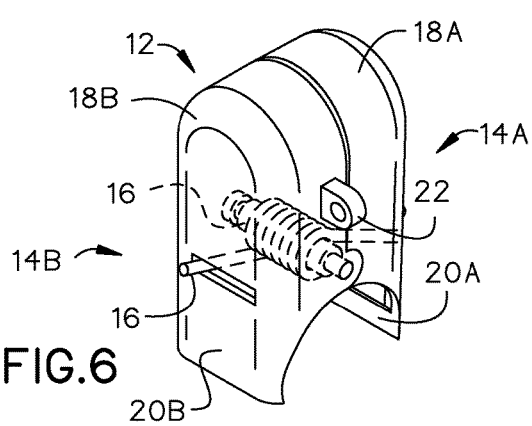
FIG. 6 is a perspective view of an embodiment of the clip shown in compressed configuration.
Figure 7:
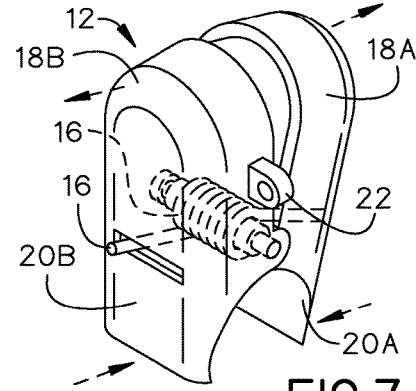
FIG. 7 is a perspective view of an embodiment of the clip shown in expanded configuration.

Stroller roller 10 comprises wheel clamp assembly 12, which is shown in more detail in FIG. 6 and FIG. 7. Wheel clamp assembly 12 is connected to extendable arm assembly 20, which is shown in more detail in FIG. 4 and FIG. 5. Extendable arm assembly 24 is attached to motor rear housing 54 on frame clamp assembly 40, which is shown in more detail in FIG. 3. Stroller roller 10 operates to move wheel W back and forth as shown in FIG. 9, FIG. 10, FIG. 11 and FIG. 12.

Wheel clamp assembly 12 comprises first arm 14A and second arm 14B rotationally connected to one another by spring 16. Each arm 14 has an upper portion 18 and a concave lower portion 20. Spring 16 further biases the first arm upper portion 18A away from second arm upper portion 18B while first arm concave lower portion 20A is biased toward second arm concave lower portion 20B. Second arm 14B is further attached to attachment protrusion 22.

Extendable arm assembly 24 further comprises inner shaft pivot attachment end 26 mechanically coupled to inner shaft 28. Inner shaft 28 is configured to slide in and out of outer shaft 30. Outer shaft 30 is mechanically coupled to locking knob 32 which is configured to stop the movement inner shaft 28 in and out of outer shaft 30. Outer shaft 30 is further mechanically coupled to outer shaft pivot attachment end 34.

Frame clamp assembly 40 comprises grip bracket 42. Grip bracket 42 is formed to have grip bracket rail 44 at a first end and lock knob receiver 46 at a second end. Lock knob receiver 46 can be mechanically coupled to inner grip bar 48 with a plurality of nuts 50 and lock knob 52. Motor rear housing 54 is formed at a first side with motor rear housing bracket U-Channel 56 and with motor rear housing motor cavity 58 at a second side.

Motor rear housing motor cavity 58 is configured to accommodate motor 60. Motor 60 is configured to receive electrical power and use that electrical power to turn motor shaft 62. Motor shaft 62 can be mechanically coupled to rotary arm 64. Motor rear housing 58 is mechanically coupled to motor front housing 66.

Motor front housing 66 further comprises battery compartment 68 which is configured to hold at least one battery 70. Battery compartment 68 can be accessed by removing battery cover 72. Motor front housing 66 further comprises motor front housing motor cavity 74. In this regard, motor front housing 66 accommodates motor 50 in substantially the same matter as motor rear housing motor cavity 58.

Motor front housing 66 further comprises switch 76. Switch 76 is electrically coupled to at least one battery 70 and motor 60 such that when a circuit is closed, electrical power travels to motor 60 and turns motor shaft 62.

Figure 2:
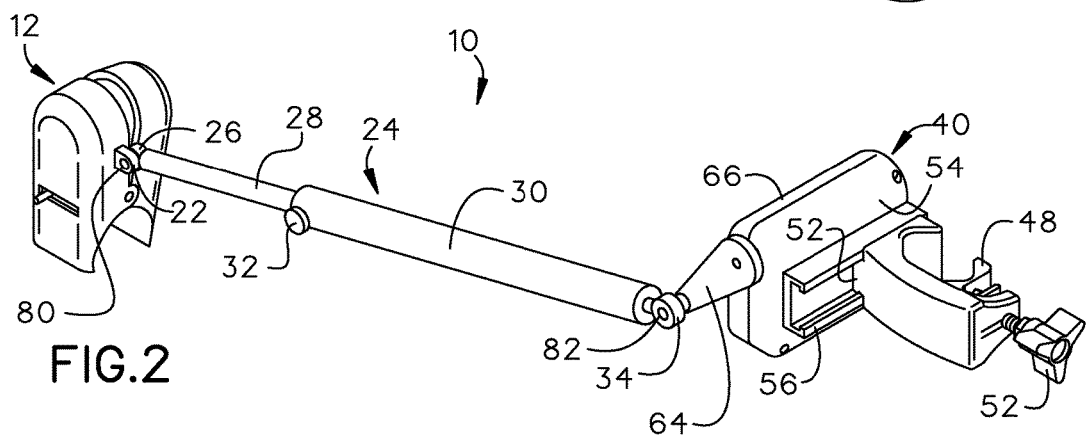
FIG. 2 is a perspective view of an embodiment of the invention.

FIG. 2 shows how these components come together. Attachment protrusion 22 is joined to inner shaft pivot attachment end 26 with first pivot rod 80. Similarly, rotary arm 64 is joined to outer shaft pivot attachment end 34 with second pivot rod 82.

Figure 8:
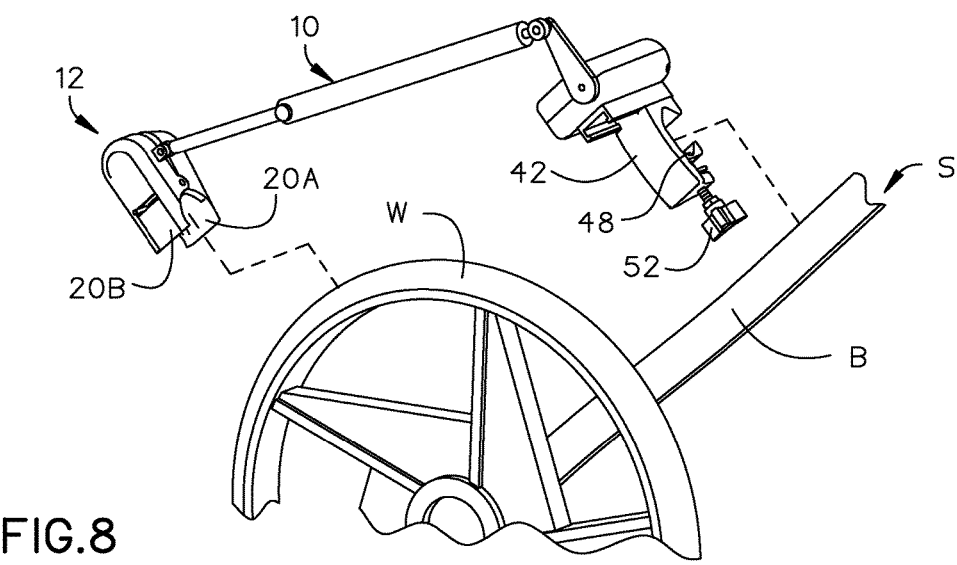
FIG. 8 is an exploded view demonstrating invention being applied.
Figure 9:
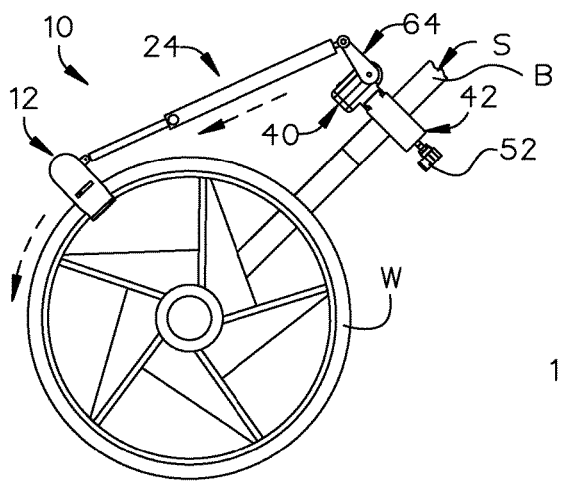
FIG. 9 is a side detail view of an embodiment of the invention demonstrated in use in initial exemplary rotary stage.
Figure 10:
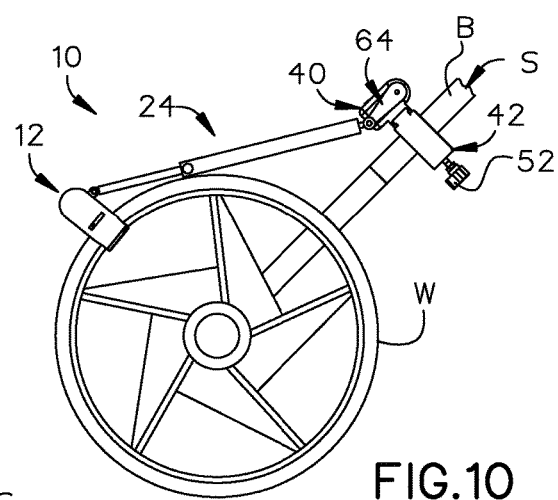
FIG. 10 is a side detail view of an embodiment of the invention demonstrated in use in a 90 degree relative position to FIG. 9.
Figure 11:
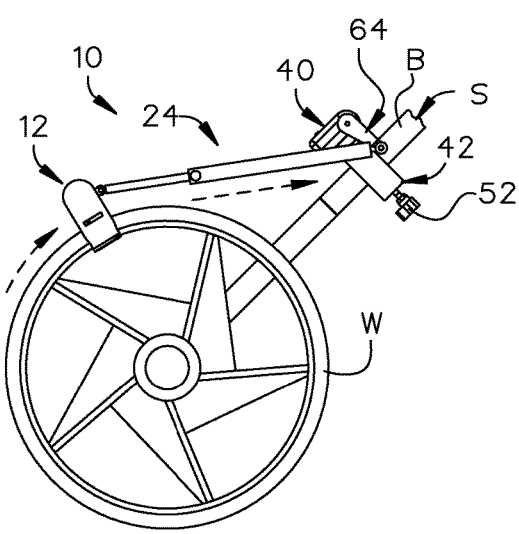
FIG. 11 is a side detail view of an embodiment of the invention demonstrated in use in a 90 degree relative position to FIG. 10.
Figure 12:
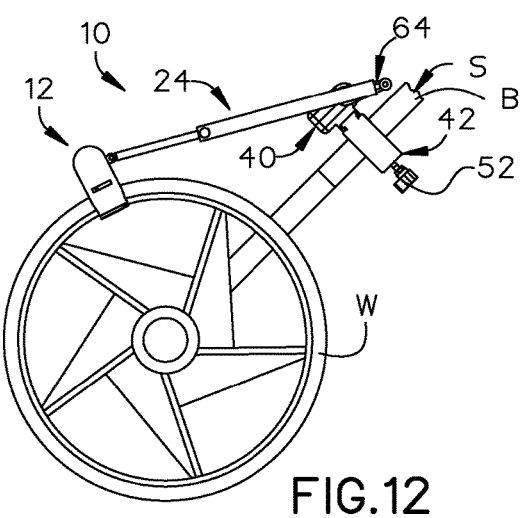
FIG. 12 is a side detail view of an embodiment of the invention demonstrated in use in a 90 degree relative position to FIG. 11.

Turning to FIG. 8, first arm concave lower portion 20A and second arm concave lower portion 20B are configured to grasp around and hold wheel W. Grip bracket 42 and inner grip bar 48 are configured to attach to frame B.

FIG. 9, FIG. 10, FIG. 11 and FIG. 12 demonstrate a mode of operation for stroller roller 10. Motor shaft 62 turns rotary arm 64 such that second pivot rod 82 moves proximate and distant first pivot rod 80. When second pivot rod 82 moves distant first pivot rod 80 as wheel W rotates counterclockwise until reaching a maximum distal point. From the maximum distal point, second pivot rod 82 moves proximate first pivot rod 80 as wheel W rotates clockwise until reaching a maximum proximate point.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A stroller roller, configured to be attached to a stroller having a frame attached to a wheel; the stroller roller comprising:
   a wheel clamp assembly configured to grasp the wheel;
   an extendable arm assembly attached to the wheel clamp assembly;
   a frame clamp assembly, attached to the extendable arm assembly and configured to grasp the frame; wherein the frame clamp assembly further comprises:
      a grip bracket formed to have a grip bracket rail and a lock knob receiver;
      wherein the lock knob receiver is detachably coupled to an inner grip bar with a plurality of nuts and a lock knob;
      a motor rear housing further comprising a motor rear housing bracket U-Channel and a motor rear housing motor cavity; wherein the motor rear housing bracket U-Channel is detachably coupled to the grip bracket; and
      a motor having a motor shaft, configured within the motor rear housing motor cavity;
   wherein the motor is configured to receive electrical power and use the electrical power to turn the motor shaft;
   wherein the frame clamp assembly pushes the extendable arm assembly causing the wheel clamp assembly to rotate the wheel both clockwise and counterclockwise.

2. The stroller roller of claim 1, wherein the wheel clamp assembly further comprises:
   a first arm and a second arm rotationally connected to one another by a spring;
   an attachment protrusion mechanically coupled to the first arm;
   wherein the first arm further comprises a first arm upper portion and a first arm concave lower portion;
   wherein the second arm further comprises a second arm upper portion and a second arm concave lower portion;
   wherein the spring further biases the first arm upper portion away from the second arm upper portion while the first arm concave lower portion is biased toward the second arm concave lower portion.

3. The stroller roller of claim 2, wherein the extendable arm assembly further comprises:
   an inner shaft pivot attachment end mechanically coupled to an inner shaft;
   an outer shaft covering at least some of the inner shaft
   a locking knob mechanically coupled to the outer shaft;
      wherein the locking knob is configured to stop movement of the inner shaft in and out of the outer shaft; and
   an outer shaft pivot attachment end mechanically coupled to the outer shaft.

4. The stroller roller of claim 3, further comprising a motor front housing mechanically coupled to the motor rear housing; wherein the motor front housing further comprises a battery compartment, configured to hold at least one battery; a battery cover, detachably coupled to the battery compartment; and a motor front housing motor cavity configured to contain a portion of the motor.

5. The stroller roller of claim 4, further comprising a first pivot rod, configured to connect the attachment protrusion and the inner shaft pivot attachment end a rotary arm attached to the motor shaft and joined to the outer shaft pivot attachment end with a second pivot rod.

6. The stroller roller of claim 5, further comprising a switch mechanically coupled to the motor front housing; wherein the switch is electrically coupled to the at least on battery and the motor in a circuit such that when the circuit is closed, the electrical power travels to the motor and turns the motor shaft.

7. A stroller roller, configured to be attached to a stroller having a frame attached to a wheel; the stroller roller comprising:
   a wheel clamp assembly configured to grasp the wheel;
   an extendable arm assembly attached to the wheel clamp assembly;
   a frame clamp assembly, attached to the extendable arm assembly and configured to grasp the frame; wherein the frame clamp assembly further comprises:
      a grip bracket formed to have a grip bracket rail and a lock knob receiver;
      wherein the lock knob receiver is detachably coupled to an inner grip bar with a lock knob attached to a threaded post with a plurality of nuts on the threaded post and offset from the lock knob;

wherein the frame clamp assembly pushes the extendable arm assembly with a motor causing the wheel clamp assembly to rotate the wheel both clockwise and counterclockwise a motor rear housing further comprising a motor rear housing bracket U-Channel and a motor rear housing motor cavity; wherein the motor rear housing bracket U-Channel is detachably coupled to the grip bracket.

8. The stroller roller of claim 7, further comprising:

the motor having a motor shaft, configured within the motor rear housing motor cavity; wherein the motor is configured to receive electrical power and use the electrical power to turn the motor shaft.

9. The stroller roller of claim 8, further comprising a motor front housing mechanically coupled to the motor rear housing; wherein the motor front housing further comprises a battery compartment, configured to hold at least one battery; a battery cover, detachably coupled to the battery compartment; and a motor front housing motor cavity configured to contain a portion of the motor.

10. The stroller roller of claim 9, further comprising a switch mechanically coupled to the motor front housing; wherein the switch is electrically coupled to the at least one battery and the motor in a circuit such that when the circuit is closed, the electrical power travels to the motor and turns the motor shaft.

* * * * *